US009826388B2

(12) United States Patent
Ong et al.

(10) Patent No.: US 9,826,388 B2
(45) Date of Patent: Nov. 21, 2017

(54) COGNITIVE ROAMING SUPPORT

(71) Applicant: Comcast Cable Communications, LLC, Philadelphia, PA (US)

(72) Inventors: Ivan Ong, Malvern, PA (US); Phillip Andrew Sanderson, Mount Laurel, NJ (US); Thomas William Lynn, Jr., Berryville, VA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 15/048,451

(22) Filed: Feb. 19, 2016

(65) Prior Publication Data

US 2017/0245136 A1  Aug. 24, 2017

(51) Int. Cl.
| | |
|---|---|
| H04W 36/00 | (2009.01) |
| H04W 8/08 | (2009.01) |
| H04W 12/06 | (2009.01) |
| H04W 36/18 | (2009.01) |

(52) U.S. Cl.
CPC ............. *H04W 8/08* (2013.01); *H04W 12/06* (2013.01); *H04W 36/18* (2013.01)

(58) Field of Classification Search
CPC ......... H04W 4/00; H04W 4/02; H04W 4/025; H04W 4/027; H04W 4/028; H04W 8/06; H04W 8/12; H04W 8/26; H04W 8/283; H04W 48/18; H04W 64/00; H04W 36/08; H04W 36/12; H04W 36/14; H04W 36/18; H04W 36/30

USPC .................. 455/432.1, 436, 456.1
See application file for complete search history.

(56) References Cited

U.S. PATENT DOCUMENTS

| | | | |
|---|---|---|---|
| 2012/0190380 A1* | 7/2012 | Dupray ................... | G01S 1/026 455/456.1 |
| 2013/0103290 A1* | 4/2013 | Hardin ................. | G08G 1/0112 701/117 |
| 2014/0280898 A1* | 9/2014 | Voit ........................ | H04L 61/00 709/224 |
| 2015/0092676 A1* | 4/2015 | Periyalwar .......... | H04W 76/025 370/329 |

* cited by examiner

Primary Examiner — Temica M Beamer
(74) Attorney, Agent, or Firm — Ballard Spahr LLP

(57) ABSTRACT

Methods and systems are described for generating and utilizing a pattern of association. The pattern of association can comprise information that indicates to which of a plurality of network devices one or more mobile devices are likely to connect. The pattern of association can comprise information that indicates an order of association. The pattern of association can be associated with one or more factors which can be any information that provides insight into the pattern of association. The pattern of association can be used to identify a next network device that a mobile device will transition to based on which network device the mobile device is currently connected to. Data, such as authentication information, can be pushed to the identified next network device to reduce network connectivity issues that may occur by transitioning between network devices.

20 Claims, 7 Drawing Sheets

COGNITIVE ROAMING SUPPORT

BACKGROUND

Mobile devices typically access a network via a network device such as a network device (e.g., access point). In the event the mobile device moves outside of the range of the network device, the mobile device will have to connect to a different network device to continue to access the network. Transitioning between network devices can be time and resource intensive. For example, a mobile device may need to undergo an authentication process when transitioning to a new network device. The authentication process can require memory allocation, computational processes, and reservation of a channel, all of which can delay or otherwise interfere with a user experience. What is needed is a way to seamlessly transition between network devices so that the transition is less perceptible to a user. These and other shortcomings are addressed by the present disclosure.

SUMMARY

It is to be understood that both the following general description and the following detailed description are exemplary and explanatory only and are not restrictive. The present disclosure relates to systems and methods for predicting the next network device (e.g., access point) a wireless device (e.g., mobile device) will try to connect with. As a mobile device changes from connecting from one network device to another network device, movement (e.g., space-time path, a history of network devices) of the mobile device can be determined (e.g., tracked). A pattern of association can be created based on the movement of the mobile device. The pattern of association can comprise information that indicates which of the plurality of network devices the mobile devices are likely to connect to and in what order. The pattern of association can comprise percentages and/or rankings that indicate the likelihood that the mobile device will associate with one or more network devices.

The pattern of association can be based on movements of an individual wireless device (e.g., mobile device), groups of wireless devices (e.g., mobile devices), an individual network device, and/or groups of network devices.

The pattern of association can be used to predict which network device the wireless device (e.g., mobile device) might seek to associate with next. The pattern of association can also be associated with one or more factors. A factor can comprise a circumstance (e.g., environmental information, calendar information, timing information), activity (e.g., application in use, type of movement), characteristic (e.g., user characteristic, device characteristic), and/or the like. Factors can be related to and/or associated with the pattern of association. The factors can be any information that provides insight into the pattern of association. Example factors include, but are not limited to, a day of the week, a time of a day, a weather condition, an event, and the like.

Upon detection of the wireless device (e.g., mobile device) at a first network device, the pattern of association can be used to determine a second network device that the mobile device is likely to connect to next. Information related to the mobile device can be provided to the second network device in anticipation of a future connection. This information can allow seamless association with the mobile device when it enters range of the second network device. For example, authentication information, such as keys, can be provided to the second network device. The first network device can transmit one or more keys used by the mobile device to access the first network device to the second network device. In another aspect, the one or more keys can be transmitted to the second network device from a remote computing device such as a server. The second network device can pre-authenticate the mobile device based on the one or more keys. In another aspect, the pattern of association can be utilized to direct delivery of data from a remote server. For example, data currently consumed by the mobile device can be multicast to the first network device and the second network device. The second network device can deliver the data to the mobile device once the mobile device is in range, so that the data consumption by the mobile device is seamless as the mobile device transitions between the first network device and the second network device.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
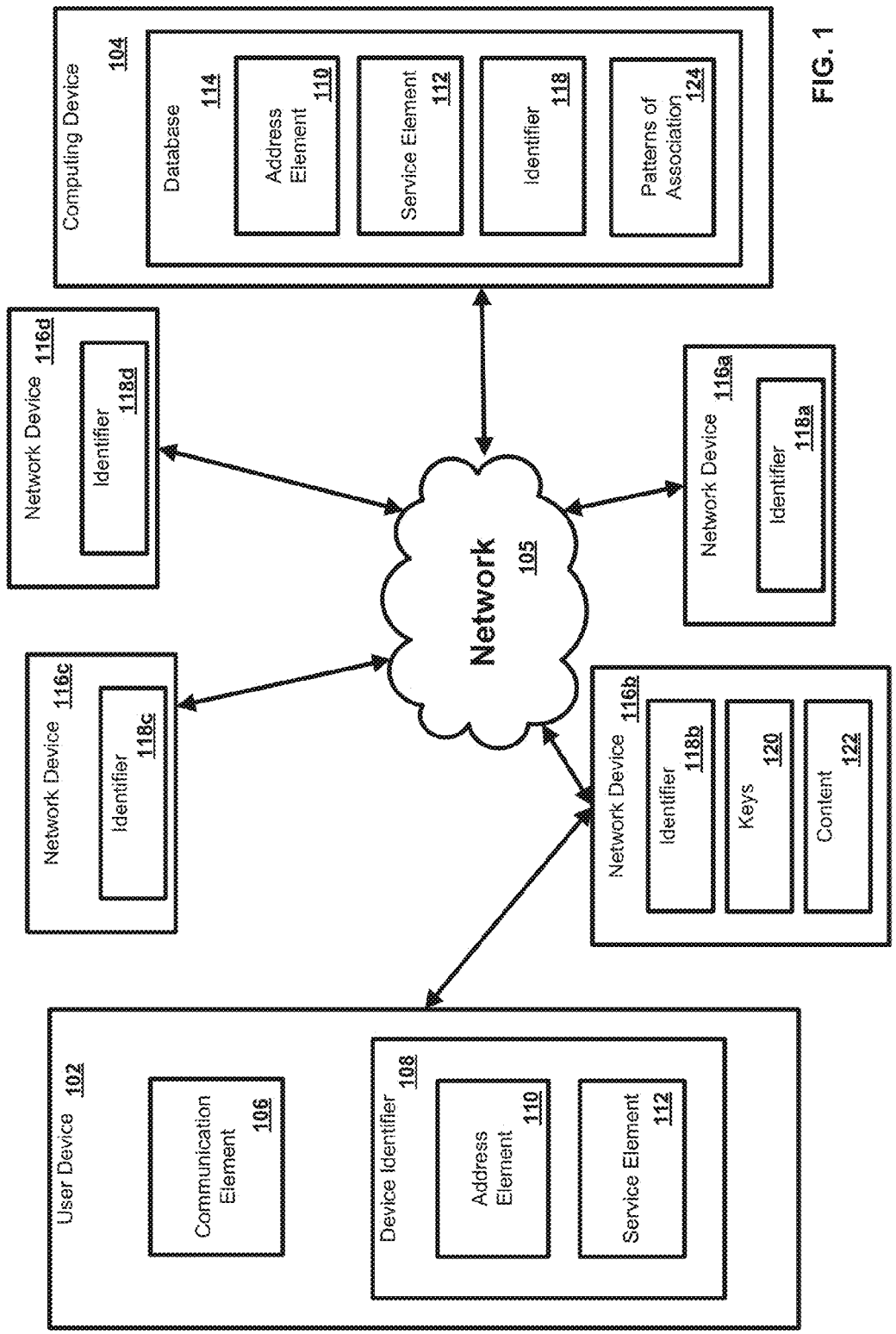
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture such as computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to systems and methods for predicting which network device (e.g., access point) a mobile device will try to connect with next. The mobile device can associate (e.g., connect, communicate) with a current network device by utilizing one or more keys in order to send/receive information. For example, the mobile device can receive content (e.g., a website, streaming media, an e-book, etc.) via the current network device.

In an aspect, an identifier of the current network device and/or a next network device can be stored in a remote server and/or in one or more network devices (e.g., access points). For example, the identifier can be stored along with identifiers of other neighboring network devices. Association (e.g., connection, communication) of the mobile device with the current network device can be a strong indication of the next network device. For example, a network device at a first train stop may have five neighboring network devices. However, the vast majority of mobile devices that associate with the network device at the first train stop will likely next associate with either a network device at the next train stop north or a network device at the next train stop south. In an aspect, association with successive network devices (e.g., multiple network devices along a path or direction) can be a strong indication of the next network device. For example, the vast majority of mobile devices that associate with the network device at the first train stop and were recently previously associated with the network device at the adjacent train stop north will likely associate next with the next train stop south.

In an aspect, as mobile devices traverse paths, one or more patterns of association can be created based on the movement of the mobile devices. The pattern(s) of association can be created for an individual mobile device, groups of mobile devices, an individual network device, and/or groups of network devices. The pattern(s) of association thus created can be used to predict which of the one or more network devices the mobile device(s) might seek to associate with next. The pattern(s) of association can be associated with one or more factors. The one or more factors can be any information that provides insight into the pattern of association. In an aspect, the pattern of association can be represented, stored, and/or the like as a data structure. The data structure representing the pattern of association can comprise one or more identifiers, such as identifiers of the current network device (e.g., access point), the mobile device associated with the current network device, the next network device, neighboring network devices. The data structure representing the pattern of association can further comprise data indicative of the one or more factors.

Once created, the one or more patterns of association can be associated with the current network device (e.g., access point) and/or one or more of the mobile devices. For example, the one or more patterns of association can indicate that one or more mobile devices associated with the current network device will likely next associate with a second network device. The current network device can transmit the one or more keys used by the one or more mobile devices to access the current network device to the second network device. In another aspect, the one or more keys can be transmitted to the second network device from a remote computing device such as a server. The second network device can use the one or more keys to pre-authenticate the one or more mobile devices, so that the one or more mobile devices can seamlessly associate with the second network device once the one or more mobile devices are in range.

In an aspect, data delivered from a remote server to the mobile device can be multicast to the current network device and the second network device. The second network device can deliver the data to the mobile device once the mobile device is in range, so that the transition between the current network device and the second network device is relatively seamless.

In one aspect of the disclosure, illustrated in FIG. 1, a system can be configured to provide services such as network-related services to a user device. In an aspect, a path, such as a walkway (e.g., at a mall or an amusement park) or a transportation route (e.g., train route, road way), can comprise multiple network devices. In another aspect, areas (e.g., geographic areas, buildings, structures), such as city blocks, office buildings, parks, or sports arenas, can comprise multiple network devices. In an aspect, associations (e.g., connections, communications, etc. . . . ) can be made between the multiple network devices (e.g., access points) and one or more user devices (e.g., mobile device, tablet, smart phone, etc.). Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

FIG. 1 illustrates various aspects of an exemplary environment in which the present methods and systems can operate. The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer®, Mozilla Firefox®, Google Chrome®, Safari®, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or a device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device 102 such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, the service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. In an aspect, the address element 110 can be used to identify, or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing data and/or services. As an example, the computing device 104 can provide services, such as network (e.g., Internet) connectivity, network printing, media management (e.g., media server), content services, streaming services, broadband services, or other network-related services. In an aspect, the computing device 104 can allow the user device 102 to interact with remote resources, such as data, devices, and files. As an example, the computing device can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of files (e.g., web pages), user identifiers or records, or other information.

As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more network devices 116a,b,c,d can be in communication with a network, such as the network 105. As an example, one or more of the network devices 116a,b,c,d can facilitate the connection of a device, such as user device 102, to the network 105. As a further example, one or more of the network devices 116a,b,c,d can be configured as a wireless access point (WAP). In an aspect, one or more of the network devices 116a,b,c,d can be configured to allow one or more wireless devices to connect to a wired and/or wireless network using Wi-Fi, Bluetooth®, Zigbee®, or any desired method or standard.

In an aspect, one or more of the network devices 116a,b,c,d can be configured as a local area network (LAN). As an example, one or more of the network devices 116a,b,c,d can comprise a dual band wireless access point. As an example, one or more of the network devices 116a,b,c,d can be configured with a first service set identifier (SSID) (e.g., associated with a user network or private network) to function as a local network for a particular user or users. As a further example, one or more of the network devices 116a,b,c,d can be configured with a second service set identifier (SSID) (e.g., associated with a public/community network or a hidden network) to function as a secondary network or redundant network for connected communication devices.

One or more of the network devices 116a,b,c,d can comprise an identifier 118a,b,c,d. As an example, one or more identifiers can be or relate to an Internet Protocol (IP) Address (e.g., IPV4/IPV6) or a media access control address (MAC address) or the like. As a further example, one or more of the identifiers 118a,b,c,d can be a unique identifier for facilitating communications on the physical network segment. In an aspect, each of the network devices 116a,b,c,d can comprise a distinct identifier 118a,b,c,d. As an example, the identifiers 118a,b,c,d can be associated with a physical location of the network devices 116a,b,c,d.

In an aspect, the user device 102 can currently be associated with one of the network devices 116a,b,c,d, such as the network device 116b. In an aspect, the currently associated network device 116b can comprise one or more keys 120 to facilitate association with the user device 102. In another aspect, the one or more keys 120 can be stored in one or more of the user device 102, the currently associated network device 116b, and/or the computing device 104. In an aspect, the currently associated network device 116b and/or the computing device 104 can comprise content 122 to push to the user device 102.

In an aspect, the computing device 104 and/or the one or more network devices 116a,b,c,d can monitor associations (e.g., connections, communications) between the one or more network devices 116a,b,c,d and one or more user devices 102. In an aspect, the computing device 104 and/or the one or more network devices 116a,b,c,d can create and store patterns of association that identify which of the one or more user devices 102 was associated with which of the one or more network devices 116a,b,c,d and in what order. The resulting patterns of association identify an order in which a user device 102 (or multiple user devices 102) is likely to connect to the one or more network devices 116a,b,c,d.

Association of a user device (e.g., mobile device) with one of the network devices 116a,b,c,d can be a strong indicator that the mobile device will next associate with another of the network devices 116a,b,c,d based on the physical location of the network devices 116a,b,c,d and knowledge of the physical location(s) of the network devices 116a,b,c,d in the vicinity. For example, if a mobile device is associated with a network device (e.g., access point) at a first train stop (e.g., $5^{th}$ Street train stop), then a prediction can be made that the mobile device will next associate with a network device at a second train stop (e.g., $6^{th}$ Street train stop). If the mobile device next associates with the network device at the second train stop, then a prediction can be made that the mobile device will next associate with a network device at a third train stop (e.g., $7^{th}$ Street train stop). In such a situation, the pattern of association can be based on the knowledge of the physical location of the train stops.

One or more patterns of association 124 can be determined, generated, created, and/or the like for an individual user device 102 and/or for groups of user devices 102. The pattern(s) of association 124 can predict which of the one or more network devices 116a,b,c,d the user device 102 might seek to associate with next based on a pattern of association 124 specific to the user device 102 and/or a general pattern of association 124 applicable to a group of user devices 102. The pattern of association 124 can comprise percentages and/or rankings that indicate the likelihood that the user device 102 will associate with one or more network devices 116a,b,c,d.

The patterns of association 124 can be associated with one or more factors. The factors can be any information that provides insight into the pattern of association. A factor can comprise a circumstance (e.g., environmental information, calendar information, timing information), activity (e.g., application in use, type of movement), characteristic (e.g., user characteristic, device characteristic), and/or the like. In an aspect, factors can be associated with an environment. In an aspect, factors associated with an environment can be associated with an environment in which the phone is operating. In an aspect, the environment in which the phone is operating can comprise a physical environment. In an aspect, the environment in which the phone is operating can comprise a digital environment. In an aspect, factors associated with an environment can comprise a circumstance (e.g., environmental information, calendar information, timing information), activity (e.g., application in use, type of movement), characteristic (e.g., user characteristic, device characteristic), and/or the like. Factors can be related to and/or associated with patterns of association for a specific user device or network device and/or with patterns of association for a group of mobile devices and/or network devices, and/or the like. Factors that are related to a general pattern of association can comprise, for example, a time of day, a day of the week, a time relative to an event (e.g., two minutes until halftime), a time relative to a schedule (e.g., a transportation vehicle is scheduled to arrive in four minutes), types of applications executing on the user devices 102, weather (e.g., a path and/or a pace taken by the user devices 102 when it is raining and/or cold outside), etc. Patterns of association that are related to a specific user device 102 can also comprise other factors specific to the user device 102, such as a time the user device 102 has been associated with one or more network devices 116*a,b,c,d*, a comprehensive history of one or more network devices 116*a,b,c,d* with which the user device 102 has associated, an abbreviated history of one or more network devices 116*a,b,c,d* with which the user device 102 has associated (e.g., the current trip, etc.), a history in relation to other factors (e.g., the path the user device 102 normally takes on Tuesday afternoons, etc.), a location (e.g., the path the user device 102 normally takes when in this city, etc.), types of applications executing on the user device 102 (e.g., a home security application, a home automation application, and the like), weather (e.g., a path and/or a pace the user device 102 takes when it is raining and/or cold outside), etc.

Factors can be determined through the use of sensors, received signals, user input, services (such as, for example, a weather service, an event scheduling service, etc.), and/or any other suitable method. For example, a thermometer can be used to determine a current temperature at the one or more network devices 116*a,b,c,d*. By way of further example, a local and/or remote clock can be used to determine a current time and/or date that the user device 102 associated with the one or more network devices 116*a,b,c,d*. Data indicative of the factors can be stored in association with the patterns of association 124 in order to supplement the accuracy of the patterns of association 124.

In an aspect, the computing device 104 and/or the one or more network devices 116*a,b,c,d* can store the patterns of association 124 and associate the patterns of association 124 with the device identifier 108 of the user device 102 that was the basis for, resulted in, and/or contributed to the creation of the patterns of association 124. In that way, the computing device 104 and/or the one or more network devices 116*a,b,c,d* can identify which of many stored patterns of association 124 are applicable to the user device 102.

For example, as shown in FIG. 1, the network device 116*b* can associate (e.g., connect, communicate) with the user device 102. The network device 116*b* can receive the device identifier 108 as part of associating with the user device 102. The network device 116*b* can use the device identifier 108 to determine if there are any patterns of association 124 that apply to the user device 102 or a subset of user devices to which the user device 102 belongs. In an aspect, the network device 116*b* can determine that a plurality of patterns of association 124 is associated with the user device 102. The network device 116*b* can determine the existence/condition of one or more factors that can indicate that one pattern of association 124 of the plurality of patterns of association 124 should be used over another pattern of association 124. For example, if the current day is Tuesday, then the pattern of association 124 retrieved can be for Tuesdays or weekdays. In a further example, if the weather conditions are sunny and 80 degrees, then the pattern of association 124 retrieved can be for a sunny day or above and/or below certain temperature thresholds (e.g., above 50 degrees but below 95 degrees). The pattern of association 124 retrieved can predict one or more likely next network devices.

Figure 3:
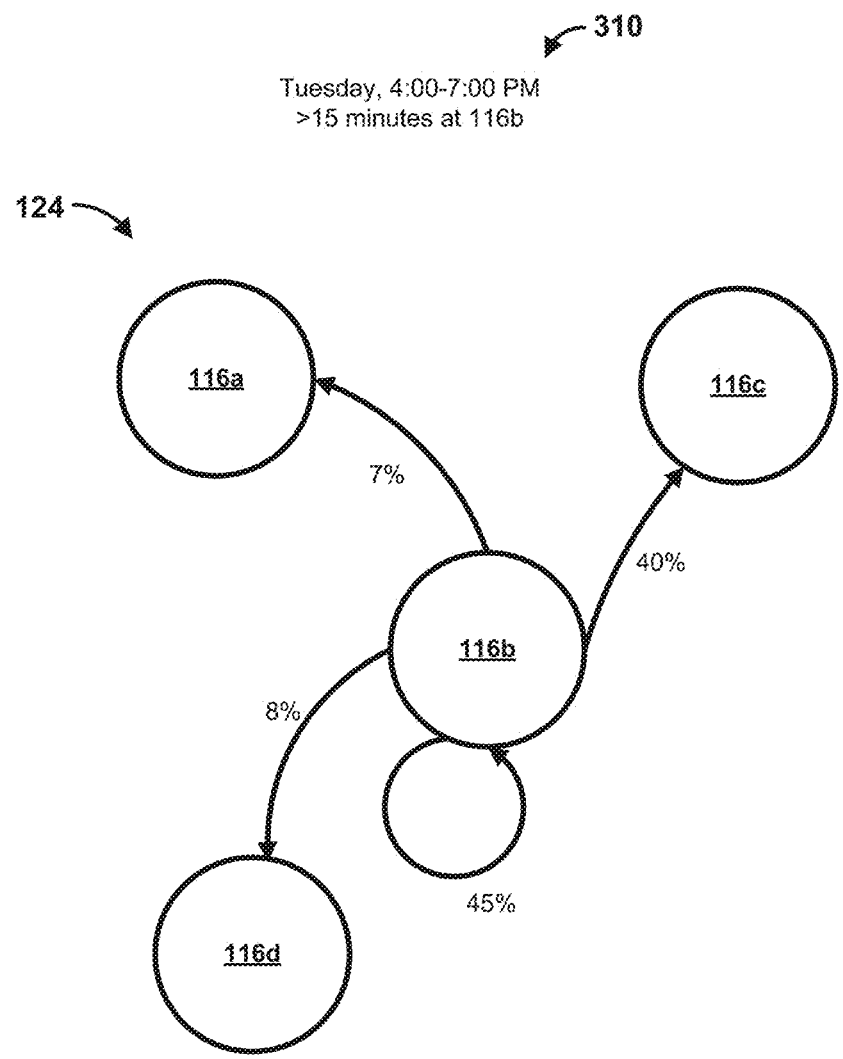
FIG. 3 is an example of a pattern of association.

For example, the network device 116*b* can determine that there is a first pattern of association 124 associated with the user device 102 that is associated with a factor of 7:00 am to 9:00 am and that there is a second pattern of association 124 associated with the user device 102 that is associated with a factor of 4:00 pm to 7:00 pm. The network device 116*b* can determine if the current time is between 7:00 am to 9:00 am, 4:00 pm to 7:00 pm, or neither. If the current time is determined to be between 7:00 am to 9:00 am, then the network device 116*b* can utilize the first pattern of association 124. If the current time is determined to be between 4:00 pm to 7:00 pm, then the network device 116*b* can utilize the second pattern of association 124 (the second pattern of association 124 is illustrated in FIG. 3). If the current time is determined to not be between 7:00 am to 9:00 am or 4:00 pm to 7:00 pm, then the network device 116*b* can utilize no pattern of association 124, but such association with the network device 116*b* can be monitored to assist in the creation of a new pattern of association 124. The network device 116*b* can utilize the second pattern of association 124 to determine that the next network device that the user device 102 is likely to associate with next is network device 116*c* based on the pattern of association 124 and can transmit the keys 120 and/or content 122 to the network device 116*c*.

In an aspect, one or more keys 120 can be pushed (e.g., communicated) between the network devices 116*a,b,c,d* and/or pushed to the network devices 116*a,b,c,d* from the computing device 104. In an aspect, the one or more keys 120 can be used to pre-authenticate the user device 102 at the one or more likely next network devices 116*a,b,c,d* before the user device 102 gets in range of one of the one or more likely next network devices 116*a,b,c,d*. The one or more keys 120 can be associated with a time-to-live (TTL) after which the one or more keys 120 can be discarded by the network devices 116*a,b,c,d*. If the user device 102 in fact associated with the likely next network device 116*a,b,c,d*, the association can be logged and reported to the computing device 104. In an aspect, such an association can be used to increase a weight given to the pattern of association, wherein a higher weight indicates higher reliability of the pattern of association. If the user device 102 did not in fact associate with the likely next network device 116*a,b,c,d*, the failure to associate can be logged and reported to the computing device 104. In an aspect, such a failed association can be used to decrease the weight given to the pattern of association, wherein a lower weight indicates low reliability of the pattern of association.

Content 122 can be pushed (e.g., provided, communicated, sent) to the one or more likely next network devices 116*a,b,c,d*. Static content, such as a website or e-book, can simply be pushed to the one or more likely next network devices 116*a,b,c,d*. In an aspect, in the case of streaming content, content delivered to the current network device 116*a,b,c,d* can also be delivered to the one or more likely next network devices 116*a,b,c,d* (e.g., the streaming content can be multicast to the current network device and the one or more likely next network devices). In an aspect, in the case of streaming content, an estimation can be made about the time of arrival at one or more likely next network devices 116*a,b,c,d*. In an aspect, an approximation of where in the content (e.g., a timestamp, a content fragment, and the like) the user device 102 will be on arrival at one or more likely next network devices can be made based on the estimation. In an aspect, a portion of the content can be pushed to the one or more likely next network devices and held in storage based on the approximation. For example, if it is estimated that the mobile device will be at a likely next network device in 2 minutes, and the mobile device is currently 17 minutes into the content, then the approximation can be that the mobile device will be at 19 minutes when the mobile device arrives in range of the likely next network device. A 30-second portion of the content starting at 18 minutes and 45 seconds into the content and ending at 19 minutes and 15 seconds into the content can be pushed to a buffer of the likely next network device.

Thus the patterns of association 124 can be used to preposition (e.g., provide/transmit in advance) keys 120 and/or content 122 at a next network device to ensure a smooth transition of content and/or data consumption by the user device 102 at the next network device.

Figure 2:
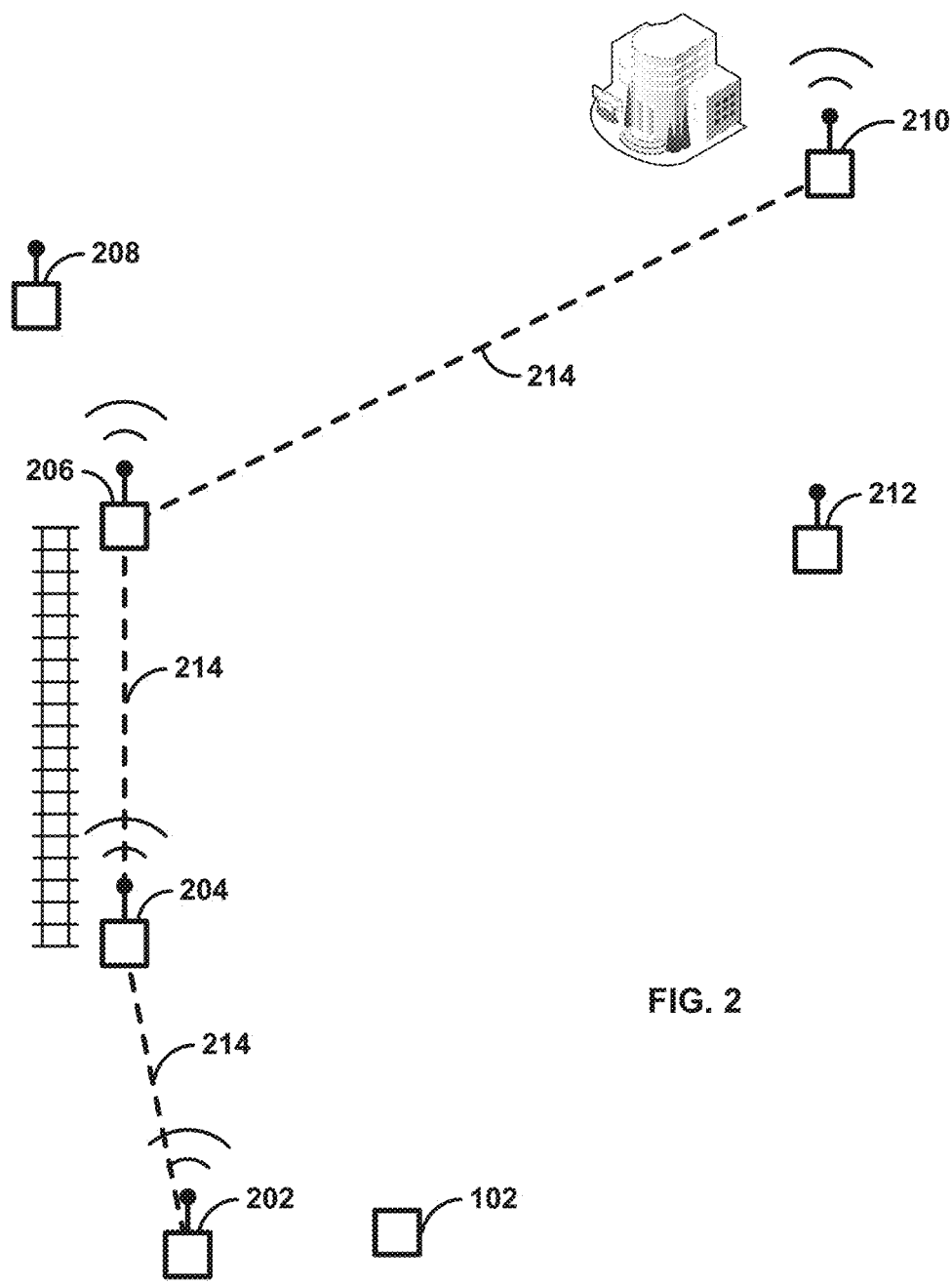
FIG. 2 is a block diagram illustrating an exemplary path.

FIG. 2 illustrates a path 214 (dashed line) taken by a user device 102 through a group of network devices that can result in creation of a pattern of association. The pattern of association can be based on an observed history of associations of the user device 102 and/or a history of associations for user devices (e.g., group of user devices) in general. In an aspect, the path 214 can begin with a user device 102 connected to a network device 202 associated with a train station parking lot. In an aspect, next on the path 214, the user device 102 can connect to a network device 204 associated with a train station stop near the train station parking lot. Next on the path 214, the user device 102 can connect to a network device 206 associated with a destination train station stop. At an end of the path 214, the user device 102 can connect to a network device 210 associated with an office. In an aspect, a pattern of association can be created based on the associations made by the user device 102 and used to determine a next network device.

In an aspect, the next time the user device 102 is connected to the network device 202, the pattern of association 124 can be accessed to determine that the network device 204 is the likely next network device. The one or more keys 120 and/or content 122 can then be pushed to the network device 204 (e.g., in advance of the user device 102 associating with the network device 204). In an aspect, the one or more keys 120 and/or content 122 can be pushed from network device to network device or from a remote computing device to the various network devices. Similarly, the pattern of association 124 can be stored and accessed locally on each network device or remotely from a computing device. In an aspect, when the user device 102 is connected to the network device 204, the pattern of association 124 can be accessed to determine that the network device 206 is the likely next network device. The one or more keys 120 and/or content 122 can then be pushed to the network device 206 in advance. In an aspect, when the user device 102 is connected to the network device 206, the pattern of association 124 can be accessed to determine that the network device 210 is the likely next network device. The one or more keys 120 and/or content 122 can then be pushed to the network device 210. In an aspect, even though a network device 208 or a network device 212 may be closer to the network device 206, the pattern of association 124 can reveal that it is more likely that the user device 102 will next connect with the network device 210. In a further aspect, the one or more keys 120 and/or content 122 can be simultaneously pushed to the network devices 204, 206, and 210 once the pattern of association 124 is accessed by the network device 202.

FIG. 3 illustrates an exemplary representation of a pattern of association (e.g., migration) 124 supplemented with one or more factors 310. The pattern of association can be for a mobile device currently associated with a particular network device. For example, the pattern of FIG. 3 is for mobile devices currently associated with the network device 116*b*. The pattern of association in FIG. 3 can comprise factors, such as the day of the week (e.g., Tuesday), the length of time that the user device has been associated with the current network device (e.g., more than 15 minutes), and a current time frame (e.g., 4:00-7:00 PM). In an aspect, the likelihood of association can be assigned to one or more of the network devices 116*a,b,c,d*. In an aspect, the likelihood of association can be a ranking, wherein one or more network devices are ranked in order of likelihood of next association. In an aspect, as shown in FIG. 3, the likelihood of association can comprise a percentage. Percentages can be determined by applying standard statistical methods to patterns of association. For example, by aggregating a total next association denominator and calculating a next association numerator for each network device that is a candidate for "next association." In an aspect, the percentage can represent a probability that a user device will associate with a corresponding network device (e.g., next, within a time period). In an aspect, the currently associated network device may or may not be considered as a likely next network device in the pattern. In an aspect, the percentage can represent a probability that a user device will be associated with a corresponding network device in a time period. For example, the percentages in FIG. 3 can represent the probability that a user device will be associated with the corresponding network device (e.g., next, in the next 5 minutes). The pattern of association of FIG. 3 is illustrated as a plurality of arrows originating from the network device 116*b* and pointing to one of the network devices 116*a,b,c,d*. Each arrow has a corresponding percentage representing the likelihood of association of the network device being pointed to. In an aspect, one of the percentages can represent a probability that the mobile device will be connected to the currently associated network device, as is shown in FIG. 3 (45%). In an aspect, the pattern can only consider the probabilities that the mobile device will be connected to network devices other than the currently associated network device. In an aspect, when a likelihood of association comprises a ranking, the likelihood of association can be represented as a list.

In an aspect, one or more likely next network devices can be chosen for the mobile device. In an aspect, the top x number of most likely next network devices can be chosen. In an aspect, if a probability exceeds a threshold percentage, then it can be chosen as a likely next network device. For example, if the percentage that a mobile device will move to a particular network device exceeds 35%, then the particular network device can be chosen as a likely next network device. In an aspect, if the currently associated network device only has one neighboring network device, then the neighboring network device can be chosen as a likely next network device without considering rankings or percentages. In another aspect, if the currently associated network device has less than a threshold number of neighboring network devices, then all of the neighboring network devices can be chosen as likely next network devices. In FIG. 3, the network device 116*c* can be chosen as a likely next network device because the network device 116*c* has a higher percentage than the other next network device candidates (the network device 116*a* and the network device 116*d*). In an aspect, the network device 116*b* and/or the computing device 104 can choose the likely next network devices. In an aspect, one or more network devices can choose the likely next network devices. In the case of a digital fingerprint for a particular user device 102, the particular user device 102 can choose the likely next network devices.

In an aspect, the one or more likely next network devices chosen can receive one or more keys for association. In an aspect, the one or more likely next network devices chosen can pre-authenticate the user device with the one or more keys. For example, in a secure environment, the one or more keys can help create a seamless transition between the network devices and a seamless experience for a user of the mobile device. In an aspect, the one or more likely next network devices chosen can receive content requested by the user device. For example, if a network is congested and the mobile device is streaming video content, the one or more likely next network devices chosen can receive some threshold buffer length, such as 30 seconds, of the streaming video content. Providing such content to the network devices can prevent network latency from disrupting the streaming video content presented on the mobile device. In FIG. 3, the network device 116c can be identified as the recipient the one or more keys 120 and/or the content 122 in response to the network device 116c being chosen as the likely next network device.

Figure 4:
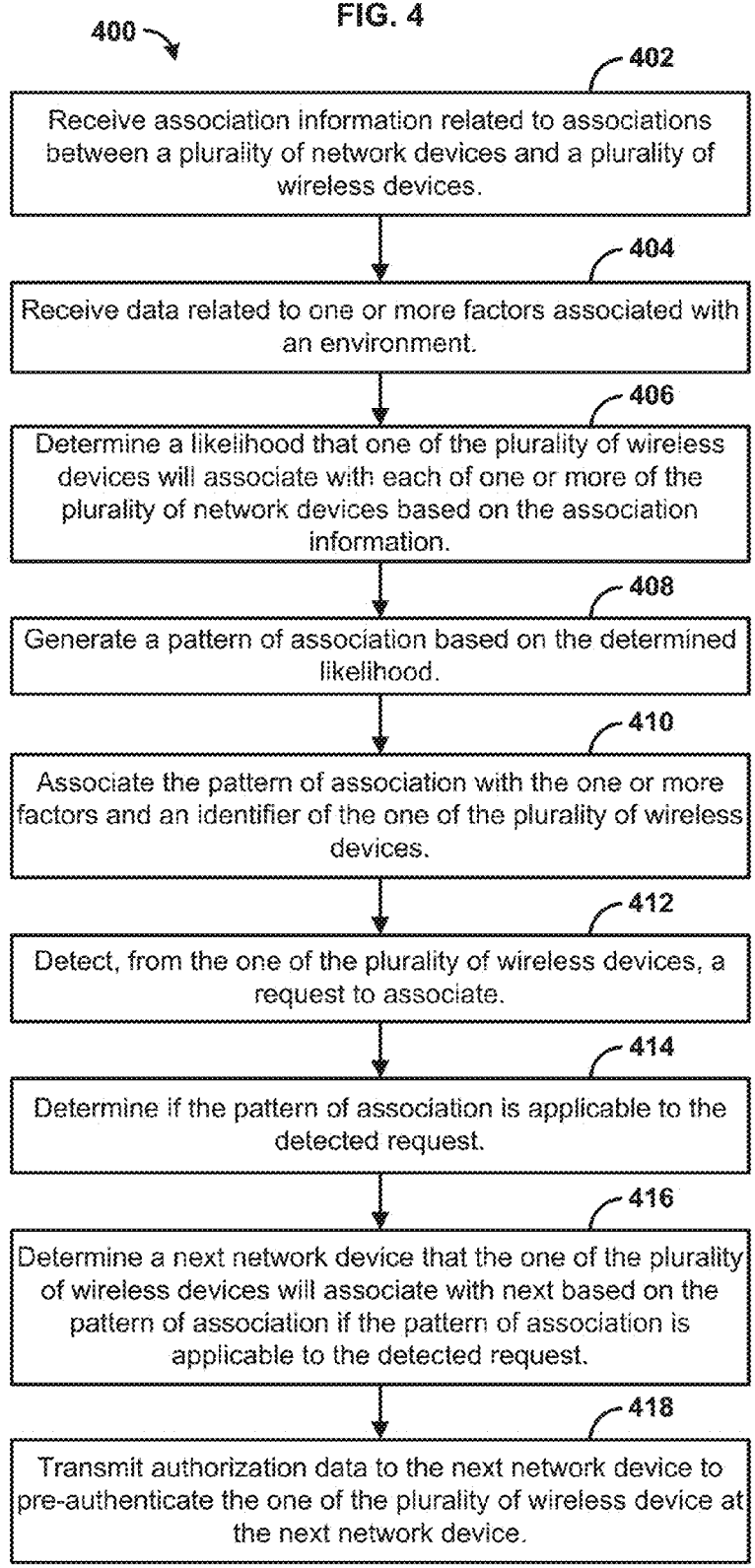
FIG. 4 is a flow chart of an exemplary method.

FIG. 4 illustrates an exemplary method 400 executing on one or more network devices 116, one or more user devices 102, and/or one or more computing devices 104 for implementing the systems and methods described herein. At step 402, association information related to associations between a plurality of network devices and a plurality of wireless devices can be received. In an aspect, a network device can be an access point. In an aspect, a wireless device can be a user device 102, a mobile device, a tablet, a smart phone, or the like. The association information can comprise information related to associations (e.g., connections, communications, etc. . . . ) made between the plurality of wireless devices and the plurality of network devices. The association information can comprise one or more identifiers for the plurality of network devices and/or the plurality of wireless devices. The association information can further comprise a log (e.g., event history) indicative of each time one or more of the plurality of wireless devices associates (e.g., connects, communicates, etc. . . . ) with one or more of the plurality of network devices. The association information can be received, for example, by logging each time a wireless device associates with a network device. The association information can be logged and stored by one or more of the plurality of wireless devices, one or more of the plurality of network devices, and/or one or more remote computing devices.

At step 404, data related to one or more factors can be received. A factor can comprise a circumstance (e.g., environmental information, calendar information, timing information), activity (e.g., application in use, type of movement), characteristic (e.g., user characteristic, device characteristic), and/or the like. Factors can be associated with an environment. Factors can be related to and/or associated with the pattern of association. Factors can be any information that provides insight on a pattern of association. The one or more factors can be considered a general factor (e.g., applicable to the plurality of wireless devices) and/or a specific factor (e.g., applicable to one of the plurality of wireless devices). General factors can comprise, for example, a time of day, a day of the week, a time relative to an event (e.g., two minutes until halftime), a time relative to a schedule (e.g., a transportation vehicle is scheduled to arrive in four minutes), types of applications executing on the wireless devices, weather (e.g., a path and/or a pace wireless devices take when it is raining and/or cold outside), etc. Specific factors can comprise, for example, a time the wireless device has been associated with one or more network devices, a comprehensive history of one or more network devices with which the wireless device has associated, an abbreviated history of one or more network devices with which the wireless device has associated (e.g., the current trip, etc.), a history in relation to other factors (e.g., the path the wireless device normally takes on Tuesday afternoons, etc.), a location (e.g., the path the wireless device normally takes when in this city, etc.), types of applications executing on the wireless device (e.g., a home security application, a home automation application, and the like), weather (e.g., a path and/or a pace the wireless device takes when it is raining and/or cold outside), etc.

In another aspect, the data related to one or more factors can be received through the use of one or more sensors, user input, sending requests to and/or receiving updates from local and/or remote services (such as, for example, a time/date service, a weather service, an event scheduling service, etc.), and/or any other suitable method. In an aspect, the data can be received from the wireless device. For example, a clock on the wireless device can provide the time or a weather application running on the wireless device can provide current weather information.

At step 406, a likelihood that one of the plurality of wireless devices will associate with each of one or more of the plurality of network devices can be determined based on the association information. Determining the likelihood can comprise determining the likelihood that the one of the plurality of wireless devices will associate with one or more of the plurality of network devices based on which of the plurality of network devices the one of the plurality of wireless devices is currently associated with. In one aspect, the likelihood can be determined based on a number of times the one of the plurality of wireless devices associates with a first network device after associating with a second network device. For example, out of a threshold number of occurrences (e.g., 10), if a given wireless device that is presently connected to network device A next connects to network device B seven out of ten times, network device C two out of ten times, and network device D one out of ten times, then network device B can have a likelihood of 70%, network device C can have a likelihood of 20%, and network device D can have a likelihood of 10%. More advanced statistical methods, such as Bayesian statistics, can be used to generate more advanced patterns of association.

At step 408, a pattern of association can be generated based on the determined likelihood(s). In an aspect, the pattern of association can comprise information that indicates which of the plurality of network devices the one of the plurality of wireless devices is likely to connect to and in what order. The pattern of association thus can identify an order in which the one of the plurality of wireless devices connects to one or more of the plurality of network devices. In an aspect, the pattern of association can be associated with at least one of the plurality of network devices and/or the one of the plurality of wireless devices.

At step 410, the pattern of association can be associated with the one or more factors. The pattern of association can also be associated with an identifier of the one of the plurality of wireless devices. The pattern of association can also be associated with the one or more factors based on which of the one or more factors was received/was present concurrently with the association information. In the above example, if the threshold number of occurrences all occurred at approximately the same time of day, then the resulting pattern of association can be further associated with that time of day. The pattern of association can be associated with an identifier of the plurality of network devices and/or the identifier of the one of the plurality of wireless devices that resulted in and/or contributed to the generation of the pattern of association. In that way the pattern of association can be identified. The identifier can be any identifier, token, character, string, or the like, for differentiating one wireless device from another wireless device. In a further aspect, the identifier can identify a user or wireless device as belonging to a particular class of users or user devices. As a further example, the identifier can comprise information relating to the wireless device such as a manufacturer, a model or type of device, and the like. The identifier can be, for example, an internet protocol address, a network address, a media access control (MAC) address, and the like. In some aspect, the identifier can be relied upon to establish a communication session (e.g., association) between the one of the plurality of wireless devices and one or more of the plurality of network devices.

Steps 402 through 410 can be repeated any number of times to create any number of patterns of association. For example, a variety of patterns of association can be created that are specific to a particular factor, a group of factors, a wireless device, a group of wireless devices, and combinations thereof.

At step 412, a request to associate can be detected from the one of the plurality of wireless devices. The detection can be performed by the one of the plurality of wireless devices, the plurality of network devices, a remote computing device (e.g., managed by a service provider and/or a content provider), and combinations thereof. In an aspect, the identifier of the one of the plurality of wireless devices can be received. In an aspect, when the one of the plurality of wireless devices associates with and/or attempts to associate with one or more of the plurality of network devices, the association (or attempted association) can be dependent upon the exchange of the identifier for the one of the plurality of wireless devices.

At step 414, a determination can be made if the pattern of association is applicable to the detected request. The identifier can be compared to the identifier associated with the pattern of association, if the comparison results in a match then the pattern of association can be accessed and utilized to transmit data according to the pattern of association. In an aspect, the received identifier can be matched to the identifier associated with the pattern of association. In this way, the one of the plurality of wireless devices, one or more of the plurality of network devices, and/or a remote computing device can identify which of possibly many stored patterns of association are applicable to the one of the plurality of wireless devices.

At step 416, a next network device that the one of the plurality of wireless devices will associate with next can be determined based on the pattern of association if the pattern of association is applicable to the detected request. In an aspect, the next network device can be a most likely next network device. In an aspect, the next network device can be one of a top x number of most likely next network devices. In an aspect, the next network device can be a network device with a highest probability of being a likely next network device. In an aspect, the next network device can have a probability of being a likely next network device exceeding a threshold percentage.

At step 418, authorization data can be transmitted to the next network device to pre-authenticate the one of the plurality of wireless devices at the next network device. In an aspect, the authorization data can be one or more keys.

Figure 5:
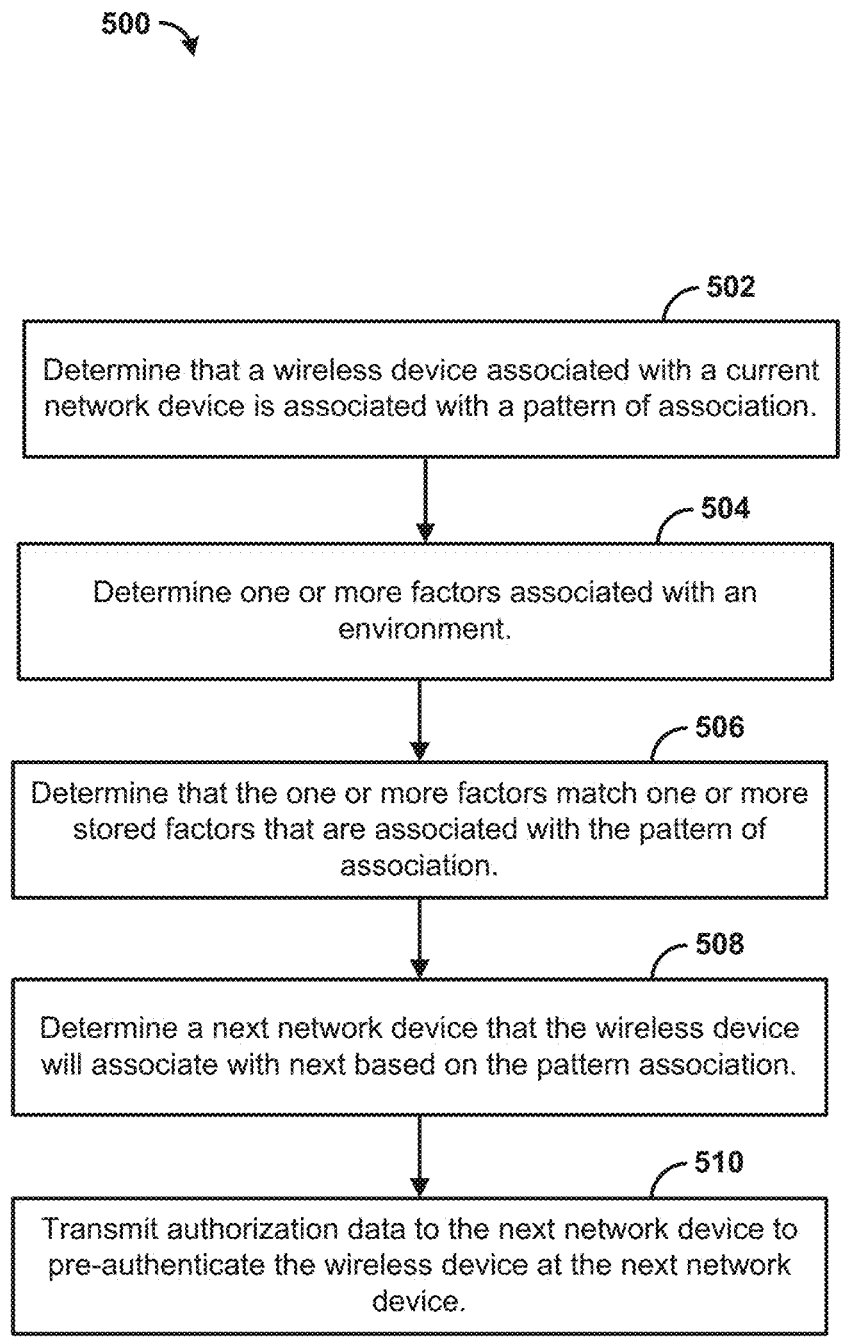
FIG. 5 is a flow chart of an exemplary method.

FIG. 5 illustrates an exemplary method 500 executing on one or more network devices 116, one or more user devices 102, and/or one or more computing devices 104 for implementing the systems and methods described herein. At step 502, it can be determined that a wireless device associated with a current network device is associated with a pattern of association. In an aspect, the determination can be made by the wireless device, the current network device, and/or a remote computing device (e.g., managed by a service provider and/or a content provider). Determining that the wireless device associated with the current network device is associated with the pattern of association can comprise determining whether an identifier of the wireless device matches an identifier associated with the pattern of association. For example, the determination can be made by receiving an indication in the form of a messaging protocol handshake acknowledgement. In an aspect, the messaging protocol handshake acknowledgment can comprise a standard 802.11 probe request. In another aspect, the messaging protocol handshake acknowledgment can comprise a standard 802.11 probe response. In a further aspect, the indication can be a message delivered via a messaging protocol. For example, the messaging protocol can comprise Bluetooth®, Zigbee®, or any other messaging protocol.

At step 504, one or more factors can be determined. A factor can comprise a circumstance (e.g., environmental information, calendar information, timing information), activity (e.g., application in use, type of movement), characteristic (e.g., user characteristic, device characteristic), and/or the like. Factors can be associated with an environment. In an aspect, the one or more factors associated with the environment can be determined by receiving data from at least a sensor. In an aspect, the one or more factors associated with the environment can be determined by receiving data from at least a local service. In an aspect, the one or more factors associated with the environment can be determined by receiving data from at least a remote service. Factors can be related to and/or associated with the pattern of association. Factors can be any information that provides insight on the pattern of association. The one or more factors can be considered a general factor (e.g., applicable to a plurality of wireless devices) and/or a specific factor (e.g., applicable the wireless device). General factors can comprise, for example, a time of day, a day of the week, a time relative to an event (e.g., two minutes until halftime), a time relative to a schedule (e.g., a transportation vehicle is scheduled to arrive in four minutes), types of applications executing on the plurality of wireless devices, weather (e.g., a path and/or a pace the plurality of wireless devices take when it is raining and/or cold outside), etc. Specific factors can comprise, for example, a time the wireless device has been associated with one or more network devices, a comprehensive history of one or more network devices with which the wireless device has associated, an abbreviated history of one or more network devices with which the wireless device has associated (e.g., the current trip, etc.), a history in relation to other factors (e.g., the path the wireless device normally takes on Tuesday afternoons, etc.), a location (e.g., the path the wireless device normally takes when in this city, etc.), types of applications executing on the wireless device (e.g., a home security application, a home automation application, and the like), weather (e.g., a path and/or a pace the wireless device takes when it is raining and/or cold outside), etc.

In an aspect, the determination of the one or more factors can be performed by the wireless device, the current network device, a remote computing device, and combinations thereof. In another aspect, the one or more factors can be determined through the use of one or more sensors, user input, sending requests to and/or receiving updates from local and/or remote services (such as, for example, a time/date service, a weather service, an event scheduling service, etc.), and/or any other suitable method. In an aspect, the information can be collected from the wireless device. For example, a factor such as a current time of day can be determined by a clock that is either remote or local. By way of further example, a factor such as current weather can be determined by a weather service.

At step 506, a determination can be made that the one or more factors match one or more stored factors that are associated with the pattern of association, if any. If the one or more factors matches the one or more stored factors that are associated with the pattern of association, the pattern of association can be selected for use. For example, a factor such as day of the week (e.g., Tuesday) can be determined and compared with stored factors to determine if any of the stored factors are a matching day of the week (e.g., Tuesday). In the event that the wireless device is associated with more than one pattern of association, the comparison of the one or more factors can be used to select the pattern of association that best fits the present scenario. Comparison between the one or more factors and the one or more stored factors can comprise, for example, string matching, date comparison, time comparison, and any other technique for determining the differences and similarities between data.

At step 508, a next network device that the wireless device will associate with next can be determined (e.g., predicted) based on the pattern of association. In an aspect, the pattern of association can comprise one or more likelihoods that the wireless device will associate with one or more of a plurality of network devices based on which of the plurality of network devices the wireless device is currently associated with. In one aspect, the likelihood can be determined based on a number of times a wireless device associates a first network device after associating with a second network device. The likelihood can vary among different patterns of association based on the presence and/or absence the one or more factors. For example, out of a threshold number of occurrences (e.g., 10), if a given wireless device that is presently connected to network device A next connects to network device B seven out of ten times, network device C two out of ten times, and network device D one out of ten times, then network device B can have a likelihood of 70%, network device C can have a likelihood of 20%, and network device D can have a likelihood of 10%. More advanced statistical methods, such as Bayesian statistics, can be used to generate more advanced patterns of association.

In an aspect, the next network device can be the network device having a highest likelihood in the pattern of association. In another aspect, a predetermined number of network devices can be determined to be the next network device. For example, the network devices having the top three highest likelihoods can be identified collectively as the next network device.

At step 510, authorization data can be transmitted to the next network device to pre-authenticate the wireless device at the next network device. If more than one network device has been determined to be the next network device, the data can be transmitted to each network device identified as the next network device. In an aspect, the transmitted data can comprise authorization data, such as one or more keys. In an aspect, the one or more keys can be used to pre-authenticate the wireless device at the next network device. In an aspect, the data can comprise content, such as static content and/or streaming content. In the case of streaming content, content currently streaming to the wireless device can be prepositioned at (e.g., provided in advance of the wireless device being in range) the next network device (e.g., the streaming content can be multicast to the current network device and the next network device). An estimation can be made about the time of arrival at the next network device. An approximation of where in the content the wireless device will be upon arrival at the next network device can be made based on the estimation. In an aspect, a portion of the content can be transmitted to the next network device and held in storage based on the approximation. For example, if it is estimated that the wireless device will be at the next network device in 2 minutes, and the wireless device is currently 17 minutes into the content, then the approximation can be that the wireless device will be at 19 minutes when the wireless device arrives in range of the next network device. A 30-second portion of the content starting at 18 minutes and 45 seconds into the content and ending at 19 minutes and 15 seconds into the content can be transmitted to a buffer of the next network device so that the content is available and ready for transmission to the wireless device.

Optionally, a determination can be made that the wireless device did not associate with the next network device and the pattern of association can be altered accordingly. In an aspect, a confidence level in the pattern of association can be reduced. If the confidence level is below a threshold then the pattern of association can be discarded or made dormant. In an aspect, if the pattern of association is specific for a particular wireless device, then deviations from expected behavior can alter the pattern of association or cause multiple patterns to be created. The pattern of association can be associated with a dormant state if a deviation from expected behavior occurs. While the pattern of association has a dormant state, the pattern of association can be (e.g., at least temporarily) ignored or given decreased weight. The pattern of association can be returned to an active state upon the occurrence of compliance with the pattern of association (e.g., the wireless device associating with network devices in accordance with the pattern of association). In an aspect, a threshold number of occurrences of compliance can be required before returning the pattern of association to an active state. For example, a user who normally works from an office building may be working from a library for several weeks. The user may normally park in a subway parking lot and take a train north to the office building. However, while the user is working from the library, the user may park in the subway parking lot and take a train south to the library. After a threshold number (e.g., two) of instances of noncompliance with the pattern of association, the pattern of association can go dormant. In an aspect, the pattern of association can be revived upon an instance of compliance with the pattern of association. In an aspect, if a pattern of noncompliance with the pattern of association is suitable for a formation of another pattern, then a second pattern can be created. For example, if the user goes to his office building every weekday except Tuesdays, on which he goes to the library, then the pattern of association can be edited to exclude Tuesdays from consideration and a second pattern specifically for Tuesdays can be created.

In an aspect, the pattern of association can be discarded after a threshold number of noncompliance instances. For example, if the user that normally parks at the subway parking lot and takes the train north, gets a new job requiring the user to take the train south, then the system can discard the pattern of association after a threshold number (e.g., thirty) of noncompliant instances. In an aspect, a newly created pattern of association can replace the discarded pattern. Optionally, content being consumed by the wireless device can be transmitted to the current network device and the next network device.

Figure 6:
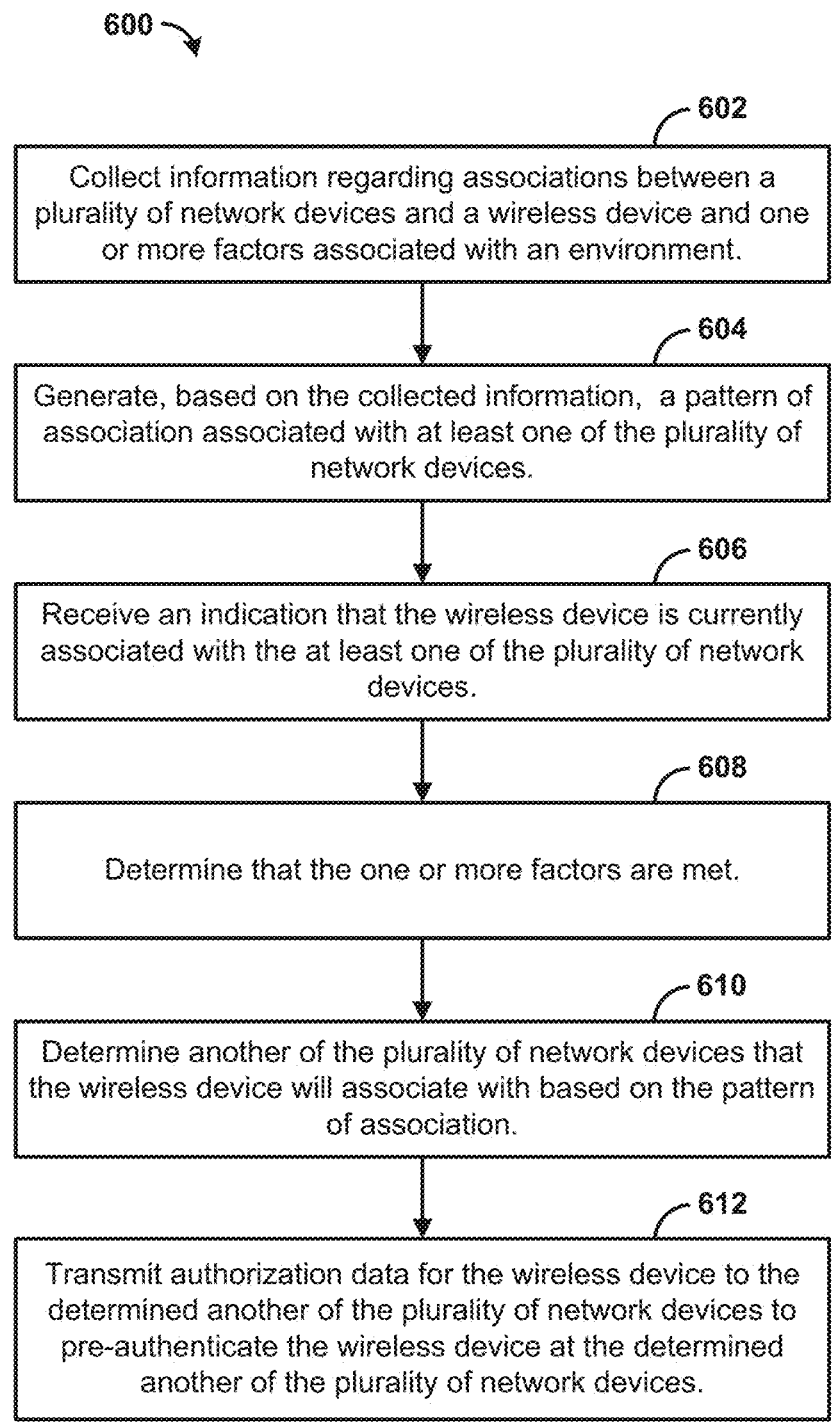
FIG. 6 is a flow chart of an exemplary method.

FIG. 6 illustrates an exemplary method 600 executing on one or more network devices 116, user devices 102, and/or one or more computing devices 104 for implementing the systems and methods described herein. At step 602, information regarding associations between a plurality of network devices and a wireless device and one or more factors can be collected. In an aspect, the one or more factors can be associated with an environment. In an aspect, a network device can be an access point. In an aspect, a wireless device can be a user device 102, a tablet, a smart phone, or the like.

The collected information can comprise association information related to associations between the plurality of network devices and the plurality of wireless devices. The association information can comprise information related to associations (e.g., connections, communications, etc. . . . ) made between the plurality of wireless devices and the plurality of network devices. The association information can comprise one or more identifiers for the plurality of network devices and/or the plurality of wireless devices. The association information can further comprise a log indicative of each time one or more of the plurality of wireless devices associates with one or more of the plurality of network devices. The association information can be collected, for example, by logging each time a wireless device associates with a network device. The association information can be logged and stored by one or more of the plurality of wireless devices, one or more of the plurality of network devices, and/or one or more remote computing devices.

The collected information can comprise data related to one or more factors. A factor can comprise a circumstance (e.g., environmental information, calendar information, timing information), activity (e.g., application in use, type of movement), characteristic (e.g., user characteristic, device characteristic), and/or the like. Factors can be related to and/or associated with the pattern of association. Factors can be any information that provides insight on the pattern of association. The one or more factors can be considered a general factor (e.g., applicable to the plurality of wireless devices) and/or a specific factor (e.g., applicable to one of the plurality of wireless devices). General factors can comprise, for example, a time of day, a day of the week, a time relative to an event (e.g., two minutes until halftime), a time relative to a schedule (e.g., a transportation vehicle is scheduled to arrive in four minutes), types of applications executing on the plurality of wireless devices, weather (e.g., a path and/or a pace the plurality of wireless devices take when it is raining and/or cold outside), etc. Specific factors can comprise, for example, a time the wireless device has been associated with one or more network devices, a comprehensive history of one or more network devices with which the wireless device has associated, an abbreviated history of one or more network devices with which the wireless device has associated (e.g., the current trip, etc.), a history in relation to other factors (e.g., the path the wireless device normally takes on Tuesday afternoons, etc.), a location (e.g., the path the wireless device normally takes when in this city, etc.), types of applications executing on the wireless device (e.g., a home security application, a home automation application, and the like), weather (e.g., a path and/or a pace the wireless device takes when it is raining and/or cold outside), etc.

In another aspect, the data related to one or more factors can be collected through the use of one or more sensors, user input, sending requests to and/or receiving updates from local and/or remote services (such as, for example, a time/date service, a weather service, an event scheduling service, etc.), and/or any other suitable method. In an aspect, the information can be collected from the wireless device. For example, a clock on the wireless device can provide the time or a weather application running on the wireless device can provide current weather information.

At step 604, the collected information can be generated based on a pattern of association associated with at least one of the plurality of network devices. In an aspect, the pattern of association can be created as described in FIG. 4. The pattern of association can comprise information that indicates to which of the plurality of network devices that the wireless device is likely to connect. The pattern of association thus can identify an order in which the plurality of wireless devices connects to one or more of the plurality of network devices.

At step 606, an indication that the wireless device is currently associated with the at least one of the plurality of network devices can be received. In an aspect, the indication can be received from the wireless device and/or the at least one of the plurality of network devices. In a further aspect, the indication can be a messaging protocol handshake acknowledgement. For example, the messaging protocol handshake acknowledgment can comprise a standard 802.11 probe request. In another example, the messaging protocol handshake acknowledgment can comprise a standard 802.11 probe response. In an aspect, the indication can be received from a network device. The network device can be a device configured to provide access to a network using a Wi-Fi protocol, such as an access point. In a further aspect, the indication can be a message delivered via a messaging protocol. For example, the messaging protocol can comprise Bluetooth®, Zigbee®, or any other messaging protocol.

In step 608, a determination can be made that the one or more factors are met (e.g., present). If the one or more factors are met, the pattern of association can be selected for use. Determining that the one or more factors are met can comprise, for example, string matching, date comparison, time comparison, and any other technique for determining the differences and similarities between data.

Determinations for factors can be made through the interpretation of information from sensors, received signals, user input, and/or any other suitable method. For example, if the factor is that the day of the week is Tuesday, a determination can be made that the day of the week is Tuesday. In another example, if the factor is occurrence of a sporting event, an event schedule can be accessed to determine if a sporting event is currently underway. In another example, if the factor is arrival/departure of a transportation vehicle (e.g., a bus, a train, etc.), a schedule can be accessed and a determination can be made of the time of arrival/departure and/or location of the transportation vehicle. In an aspect, factors can be determined locally, for example by a program configured to keep time or the schedule. In an aspect, factors can be determined from received signals, such as, for example, signals comprising the time, schedule, and/or location. In an aspect, the signals can be received from the wireless device, a service, a computing device, another network device, or any other signal source. In an aspect, factors can comprise environmental changes, such as a change in season, a change in weather, etc. For example, a pace a wireless device takes can increase when it is raining and/or cold outside. In another example, a pace a wireless device takes can decrease when it is warm outside. In another example, a path a wireless device takes can change when it is raining and/or cold outside. In another example, a path a wireless device takes can change when it is warm outside.

In step 610, a next network device that the wireless device will associate with can be determined based on the pattern of association. In an aspect, the pattern of association can comprise one or more likelihoods that the wireless device will associate with one or more of the plurality of network devices based on which of the plurality of network devices the wireless device is currently associated with. In an aspect, the next network device can be the network device having a highest likelihood in the pattern of association. In another aspect, a predetermined number of network devices can be determined to be the next network device. For example, the network devices having the top three highest likelihoods can be identified collectively as the next network device.

At step 612, authorization data for the wireless device can be transmitted to the determined another of the plurality of network devices to pre-authenticate the wireless device at the determined another of the plurality of network devices. If more than one network device has been determined to be the next network device, the data can be transmitted to each network device identified as the next network device. In an aspect, the transmitted data can comprise authorization data, such as one or more keys. In an aspect, the one or more keys can be used to pre-authenticate the wireless device at the next network device. In an aspect, the data can comprise content, such as static content and/or streaming content. In the case of streaming content, content currently streaming to the wireless device can be prepositioned at the next network device (e.g., the streaming content can be multicast to the current network device and the next network device). An estimation can be made about the time of arrival at the next network device. An approximation of where in the content the wireless device will be upon arrival at the next network device can be made based on the estimation. In an aspect, a portion of the content can be transmitted to the next network device and held in storage based on the approximation. For example, if it is estimated that the wireless device will be at the next network device in 2 minutes, and the wireless device is currently 17 minutes into the content, then the approximation can be that the wireless device will be at 19 minutes when the wireless device arrives in range of the next network device. A 30-second portion of the content starting at 18 minutes and 45 seconds into the content and ending at 19 minutes and 15 seconds into the content can be transmitted to a buffer of the next network device so that the content is available and reads' for transmission to the wireless device. Optionally, content being consumed by the wireless device can be transmitted to the at least one of the plurality of network devices and the determined another of the plurality of network devices.

Figure 7:
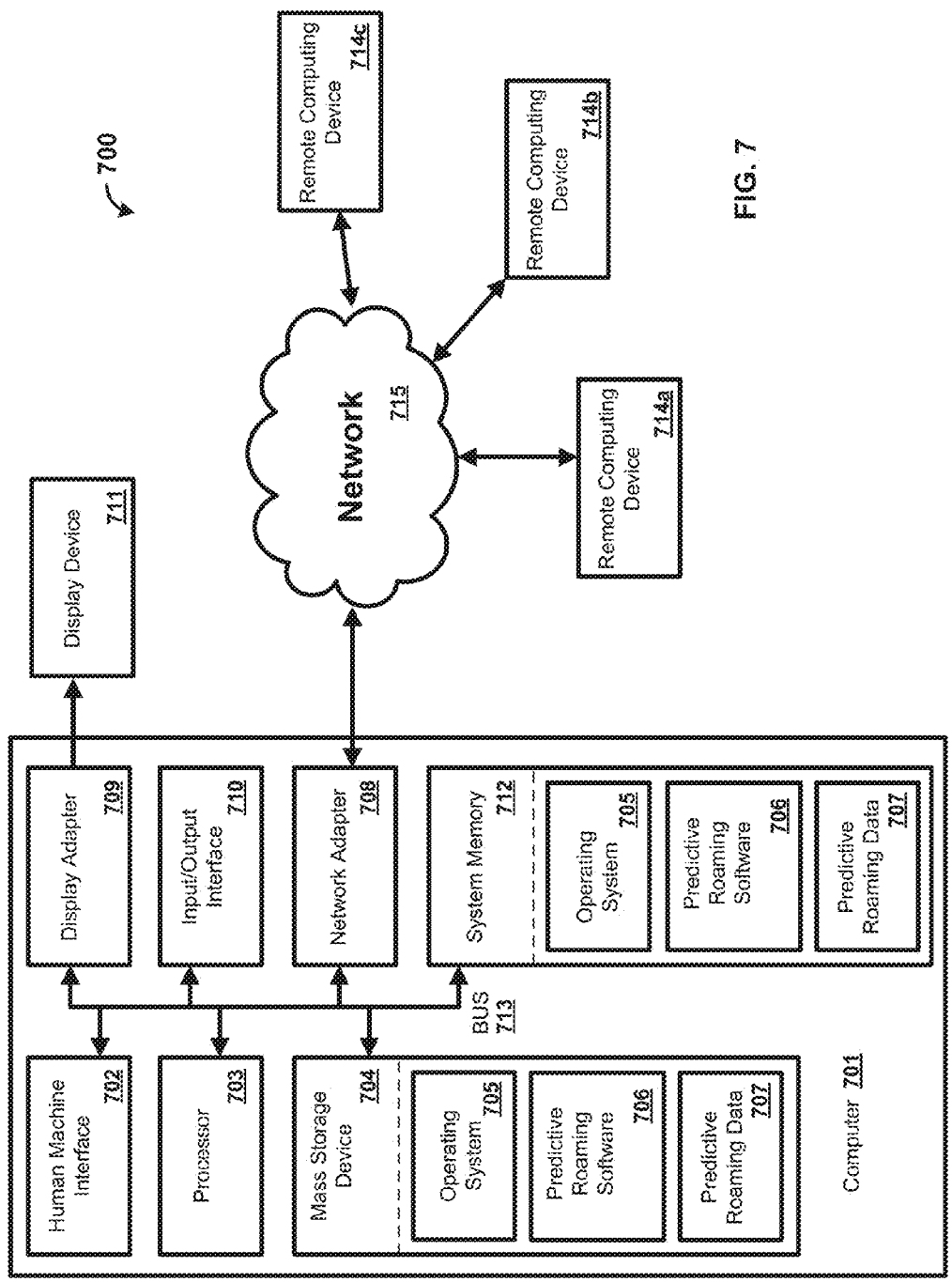
FIG. 7 is a block diagram of an exemplary computing device.

In an exemplary aspect, the methods and systems can be implemented on a computer 701 as illustrated in FIG. 7 and described below. By way of example, computing device 104, user device 102, and/or one or more of the network devices 116a,b,c,d of FIG. 1 can be a computer 701 as illustrated in FIG. 7. Similarly, the methods and systems disclosed can utilize one or more computers to perform one or more functions in one or more locations. FIG. 7 is a block diagram illustrating an exemplary operating environment 700 for performing the disclosed methods. This exemplary operating environment 700 is only an example of an operating environment and is not intended to suggest any limitation as to the scope of use or functionality of operating environment architecture. Neither should the operating environment 700 be interpreted as having any dependency or requirement relating to any one or combination of components illustrated in the exemplary operating environment 700.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media such as memory storage devices.

Further, one skilled in the art will appreciate that the systems and methods disclosed herein can be implemented via a general-purpose computing device in the form of a computer 701. The computer 701 can comprise one or more components, such as one or more processors 703, a system memory 712, and a bus 713 that couples various components of the computer 701 comprising the one or more processors 703 to the system memory 712. The system can utilize parallel computing.

The bus 713 can comprise one or more of several possible types of bus structures, such as a memory bus, memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA). Universal Serial Bus (USB) and the like. The bus 713, and all buses specified in this description can also be implemented over a wired or wireless network connection and one or more of the components of the computer 701, such as the one or more processors 703, a mass storage device 704, an operating system 705, predictive roaming software 706, predictive roaming data 707, a network adapter 708, the system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 can comprise computer readable media in the form of volatile memory, such as random access memory (RAM), and/or non-volatile memory, such as read only memory (ROM). The system memory 712 typically can comprise data such as the predictive roaming data 707 and/or program modules such as the operating system 705 and the predictive roaming software 706 that are accessible to and/or are operated on by the one or more processors 703.

In another aspect, the computer 701 can also comprise other removable non-removable, volatile/non-volatile computer storage media. The mass storage device 704 can provide non-volatile storage of computer code, computer readable instructions, data structures, program modules, and other data for the computer 701. For example, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, such as, by way of example, the operating system 705 and the predictive roaming software 706. One or more of the operating system 705 and the predictive roaming software 706 (or some combination thereof) can comprise elements of the programming and the predictive roaming software 706. The predictive roaming data 707 can also be stored on the mass storage device 704. The predictive roaming data 707 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 715.

In another aspect, the user can enter commands and information into the computer 701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices can be connected to the one or more processors 703 via the human machine interface 702 that is coupled to the bus 713, but can be connected by other interface and bus structures, such as a parallel port, game port, an IEEE 1394 Port (also known as a Firewire port), a serial port, a network adapter 708, and/or a universal serial bus (USB).

In yet another aspect, the display device 711 can also be connected to the bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), light emitting diode (LED) display, television, smart lens, smart glass, and/or a projector. In addition to the display device 711, other output peripheral devices can comprise components such as speakers (not shown) and a printer (not shown) which can be connected to the computer 701 via an Input/Output Interface 710. Any step and/or result of the methods can be output in any form to an output device. Such output can be any form of visual representation, comprising, but not limited to, textual, graphical, animation, audio, tactile, and the like. The display device 711 and the computer 701 can be part of one device, or separate devices.

The computer 701 can operate in a networked environment using logical connections to one or more remote computing devices 714*a,b,c*. By way of example, a remote computing device 714*a,b,c* can be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 701 and a remote computing device 714*a,b,c* can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components can reside at various times in different storage components of the computing device 701, and are executed by the one or more processors 703 of the computer 701. An implementation of the predictive roaming software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology. CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques comprise, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, such as: matters of logic with respect to arrangement of steps or operational flow:

plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving association information related to associations between a plurality of network devices and a plurality of wireless devices;
   determining a likelihood that a wireless device of the plurality of wireless devices will associate with each of the plurality of network devices based on the association information;
   generating a pattern of association based on the determined likelihood;
   associating the pattern of association with one or more factors associated with an environment and an identifier of the wireless device;
   detecting from the wireless device, a request to associate with a network device of the plurality of network devices;
   in response to a determination that the pattern of association is applicable to the detected request, determining a next network device that the wireless device will associate with next based on the pattern of association;
   sending authorization data to the next network device to pre-authenticate the wireless device at the next network device; and
   sending, to the network device and the next network device, at least a portion of content associated with the wireless device.

2. The method of claim 1, wherein the association information comprises data related to connections made between the plurality of wireless devices and the plurality of network devices.

3. The method of claim 1, wherein the association information comprises one or more identifiers for the plurality of wireless devices.

4. The method of claim 1, wherein the one or more factors associated with the environment comprises information related to at least one of, a time of day, a day of a week, and weather.

5. The method of claim 1, wherein determining the likelihood comprises determining the likelihood that the wireless device will associate with one or more of the plurality of network devices based on which of the plurality of network devices the wireless device is currently associated with.

6. The method of claim 1, wherein determining the likelihood comprises determining a number of times the wireless device associates with a first network device of the plurality of network devices after associating with a second network device of the plurality of network devices.

7. The method of claim 1, wherein the pattern of association comprises information that indicates which of the plurality of network devices the wireless device is likely to connect to and in what order.

8. The method of claim 1, wherein the associating the pattern of association with the one or more factors and the identifier of the wireless device comprises associating the pattern of association with the one or more factors received concurrently with the association information.

9. The method of claim 1, further comprising:
   receiving the identifier of the wireless device; and
   matching the received identifier to an identifier associated with the pattern of association.

10. A method comprising:
    determining that a wireless device associated with a current network device is associated with a pattern of association;
    determining one or more factors associated with an environment;
    determining that the one or more factors match one or more stored factors that are associated with the pattern of association;
    determining a next network device that the wireless device will associate with next based on the pattern of association;
    sending authorization data to the next network device to pre-authenticate the wireless device at the next network device; and
    sending, to the current network device and the next network device, at least a portion of content associated with the wireless device.

11. The method of claim 10, wherein the determining that the wireless device associated with the current network device is associated with the pattern of association comprises determining whether an identifier of the wireless device matches an identifier associated with the pattern of association.

12. The method of claim 10, wherein the determining that the wireless device associated with the current network device is associated with the pattern of association comprises performing a messaging protocol handshake acknowledgement.

13. The method of claim 10, wherein the pattern of association comprises information that indicates which of a plurality of network devices the wireless device is likely to connect to and in what order.

14. The method of claim 10, wherein the determining one or more factors associated with the environment comprises receiving data from at least a sensor, a local service, or a remote service.

15. The method of claim 10, wherein the determining that the one or more factors match the one or more stored factors that are associated with the pattern of association comprises performing one or more of string matching, date comparison, or time comparison between the one or more determined factors and the one or more stored factors.

16. The method of claim 10, wherein the pattern of association comprises a likelihood that the wireless device will associate with each of one or more network devices and the determining the next network device that the wireless device will associate with next based on the pattern of association comprises selecting a network device, of the one or more network devices, having a highest likelihood in the pattern of association as the next network device.

17. A method comprising:
    receiving information regarding associations between a plurality of network devices and a wireless device and one or more factors associated with an environment;
    generating, based on the received information, a pattern of association associated with a network device of the plurality of network devices;
    receiving an indication that the wireless device is currently associated with the network device;
    determining that the one or more factors are met;

determining another network device of the plurality of network devices that the wireless device will associate with based on the pattern of association;

sending authorization data for the wireless device to the determined another network device to pre-authenticate the wireless device at the another network device; and sending, to the network device and the another network device, at least a portion of content associated with the wireless device.

18. The method of claim 17, wherein the pattern of association comprises information that indicates to which of the plurality of network devices the wireless device is likely to connect.

19. The method of claim 17, wherein the sending at least a portion of content associated with the wireless device comprises a multicast transmission.

20. The method of claim 1, wherein the sending at least the portion of the content associated with the wireless device comprises a multicast transmission.

* * * * *